(12) United States Patent
Mitchell et al.

(10) Patent No.: US 11,914,031 B2
(45) Date of Patent: Feb. 27, 2024

(54) BUMPER RADAR CLAMP MOUNT

(71) Applicant: Bendix Commercial Vehicle Systems LLC, Elyria, OH (US)

(72) Inventors: Stephen J. Mitchell, Elyria, OH (US); Robert J. Custer, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 324 days.

(21) Appl. No.: 17/336,544

(22) Filed: Jun. 2, 2021

(65) Prior Publication Data

US 2022/0390595 A1 Dec. 8, 2022

(51) Int. Cl.
*G01S 13/931* (2020.01)
*B60R 19/48* (2006.01)
*B60R 19/24* (2006.01)

(52) U.S. Cl.
CPC .......... *G01S 13/931* (2013.01); *B60R 19/483* (2013.01); *B60R 2019/247* (2013.01); *G01S 2013/9327* (2020.01); *G01S 2013/93275* (2020.01)

(58) Field of Classification Search
CPC .......... G01S 13/931; G01S 2013/9327; G01S 2013/93275; G01S 7/4026; G01S 2013/93271; G01S 7/03; B60R 19/483; B60R 2019/247
See application file for complete search history.

(56) References Cited

U.S. PATENT DOCUMENTS

| | | | |
|---|---|---|---|
| 6,340,142 B1 | 1/2002 | Li | |
| 2002/0125383 A1* | 9/2002 | Takahashi | B60R 19/483 180/274 |
| 2005/0110701 A1 | 5/2005 | Li | |
| 2008/0179900 A1* | 7/2008 | Hartley | B60R 19/483 293/117 |
| 2014/0299644 A1* | 10/2014 | Aleem | B60R 21/00 224/555 |
| 2019/0256009 A1* | 8/2019 | Miwa | G01S 13/931 |
| 2019/0324119 A1* | 10/2019 | Matori | G01S 7/03 |
| 2020/0072964 A1* | 3/2020 | Aso | G01S 7/03 |
| 2020/0264267 A1 | 8/2020 | Gligor et al. | |

OTHER PUBLICATIONS

Farm and Livestock Staff, "Maintain Optimal Boom Height With New Radar Sensor Technology", AG Industry News-Farm and Livestock Directory, AutoBoom XRT, Nov. 30, 2020, pp. 1-3, Retrieved from https://farmandlivestockdirectory.com/radar-sensor-technology-to-maintain-optimal-boom-height/ (three (3) pages).

* cited by examiner

*Primary Examiner* — Bradley Duckworth
(74) *Attorney, Agent, or Firm* — Crowell & Moring LLP

(57) ABSTRACT

A mount for securing an element such as a radar transceiver on a vehicle includes a bracket securable to a vehicle bumper or other component. A cover plate is securable to the vehicle component opposite the bracket, and fasteners are extended through the cover plate and the bracket to clamp the bracket and the cover plate against opposite sides of the vehicle component, with the radar transceiver or other element located between the cover plate and a base of the bracket. An alignment arrangement may be included to permit changes to the positioning of the radar transceiver or other element between the cover plate and the base of the bracket for proper transceiver alignment. A process of securing a radar transceiver or other element on a vehicle is also described.

18 Claims, 3 Drawing Sheets

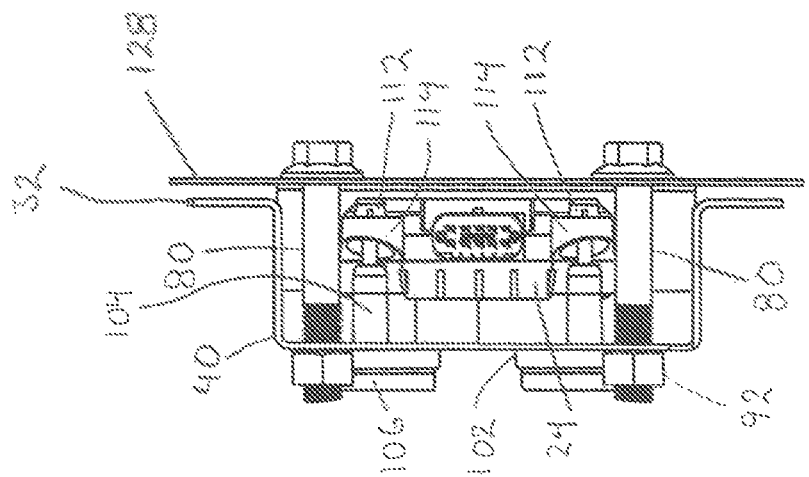
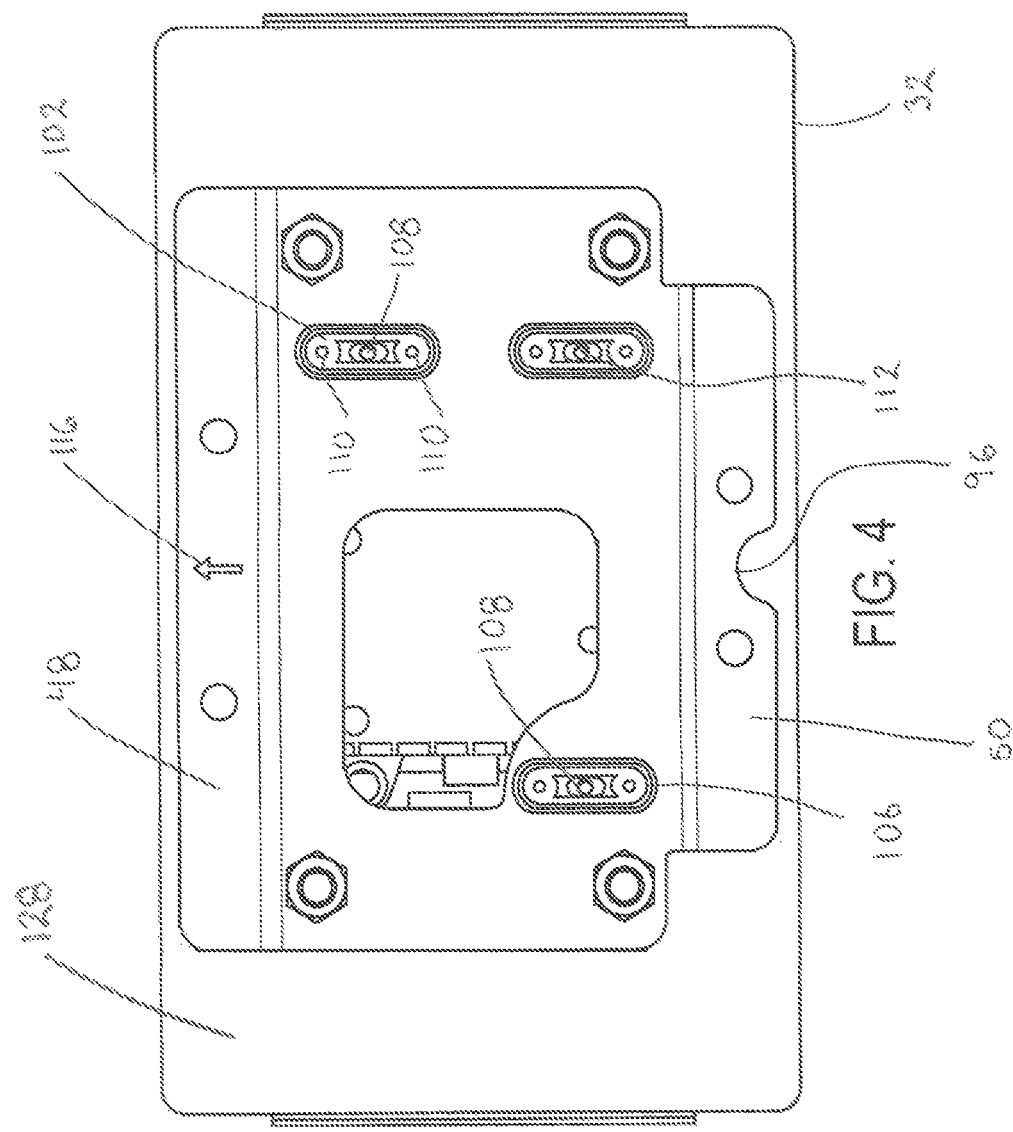

BUMPER RADAR CLAMP MOUNT

BACKGROUND OF THE INVENTION a. Field of the Invention

Installation time associated with attaching a forward-looking-radar (FLR) package or assembly to a vehicle should be minimized as much as possible. In box or package delivery vehicle applications, for example, a mount for such an FLR package or assembly should permit clamping to the front of a truck bumper without drilling any holes into the vehicle, as well as application to any of multiple truck variants to reduce installation costs.

b. Background Art

U.S. Patent Application Publication US 2005/0110701 A1 to Li discloses a fastener having engagement members that secure to the housing of a radar sensor and allow a retaining device to attach to an edge of a vehicle cover without needing to drill any holes. U.S. Pat. No. 6,340,142 B2, also to Li, discloses another clamp device for holding a radar sensor on a vehicle bumper.

U.S. Patent Application Publication US 2020/0264267 A1 to Gligor et al. concerns a holder for fixing a sensor to a motor vehicle. The sensor includes a frame and walls that bound an opening for receiving and fixing the sensor.

Finally, a Midwest•Eastern•Southern Farm & Livestock Directory publication titled Maintain Optimal Boom Height with New Radar Sensor Technology discloses a configuration identified as AUTOBOOM XRT, including a particular boom mounting arrangement.

BRIEF SUMMARY OF THE INVENTION

A mount for securing a radar transceiver or other element on a vehicle according to this invention includes a bracket securable to a vehicle bumper or other component. A cover plate is securable to the vehicle component opposite the bracket, and fasteners are extended through the cover plate and the bracket to clamp the bracket and the cover plate against opposite sides of the vehicle component, with the radar transceiver or other element located between the cover plate and a base of the bracket. In one arrangement, the fasteners can include a bolt securable in place by a nut that is adjustable to force flanges of the bracket and longitudinal edge areas of the cover plate to engage the opposite bumper surfaces. The cover plate may include an opening permitting transmission of a beam from the transceiver toward an object prior to beam reflection as well as return passage of a reflected beam following beam reflection back towards the transceiver. An alignment arrangement may be included to permit changes to the positioning of the radar transceiver or other element between the cover plate and the base of the bracket for proper transceiver alignment. This alignment arrangement can utilize adjustment screws interconnecting a casing of the transceiver with adjusters engaging the bracket. The adjusters themselves can include holes to receive pins for proper alignment during assembly.

In certain arrangements, at least one of the bracket and the cover plate has a positioning tab to keep the radar transceiver or other element properly positioned when securing the bracket and the cover plate together. Such a positioning tab can project from the bracket base, from a side of the cover plate, or both. The invention also concerns a process of securing a radar transceiver or other element on a vehicle.

While the following discussion refers to the element of interest as a radar transceiver, it is to be understood that the most basic idea is the idea of clamping the element to a vehicle component such as a bumper. The element of interest could be a fog light rather than a radar transceiver, for example. Thus, while a cover with an opening is described below, this is only because the element of interest is a radar. If the element of interest is another component not needing an opening for radar beams, or if the radar could be mounted to the outside of the cover, the cover would not necessarily include an opening such as that mentioned.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a rear view of the FLR assembly shown in FIG. 1.

FIG. 5 is a side view similar to that of FIG. 3 but showing adjusters according to the invention that permit modifying transceiver alignment.

DETAILED DESCRIPTION OF THE INVENTION

Figure 1:
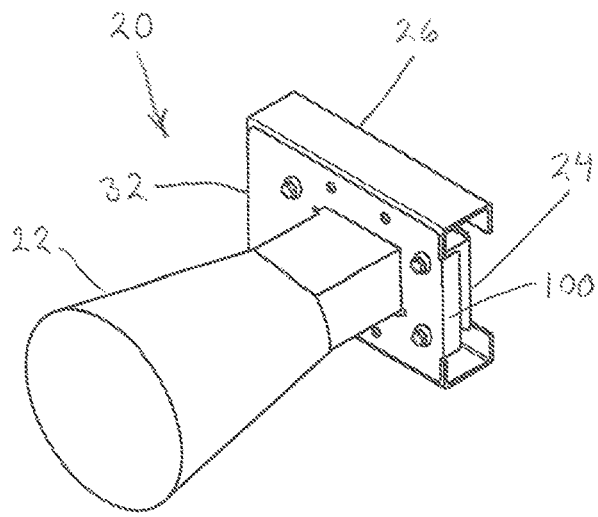
FIG. 1 is a perspective view of a forward looking radar (FLR) package or assembly according to a first embodiment of the invention.

FIG. 1 is a perspective view of a forward looking radar (FLR) package or assembly 20 according to a first embodiment of the invention with a beam 22 of radar waves illustrated schematically as emanating from a transceiver 24 included in the assembly 20. FIG. 1 shows the FLR assembly 20 as attached to a vehicle bumper 26 by way of a clamp mount 32 according to the present invention. The bumper 26 has at least one opening (not shown), which permits the beam 22 of radar waves from the transceiver 24 to travel away from the vehicle on which the FLR assembly 20 is carried.

Figure 2:
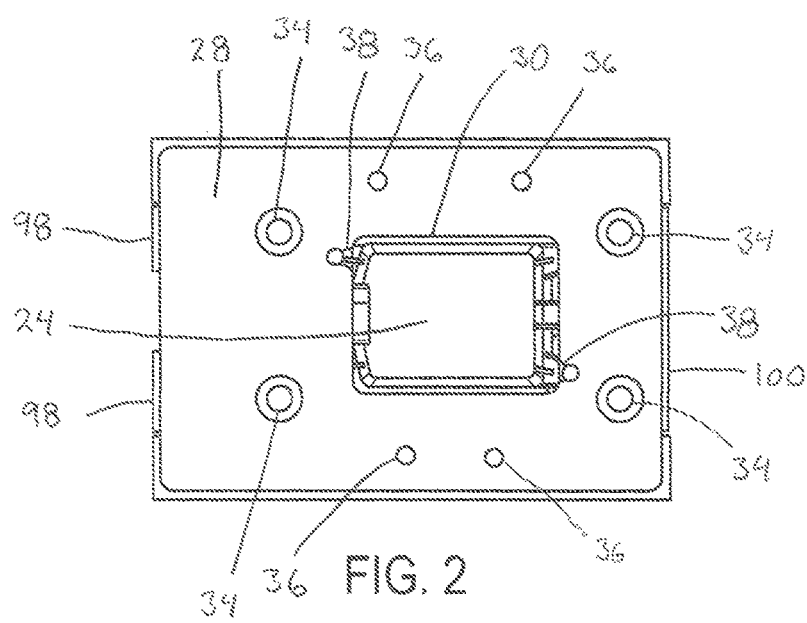
FIG. 2 is a front plan view of the FLR assembly illustrated in FIG. 1.

FIG. 2 provides a plan view of the FLR assembly illustrated in FIG. 1, and shows the particular configuration of a cover plate 28 of the assembly. The cover plate 28 shown has a large opening 30, permitting transmission of the beam 22 from the transceiver 24 toward an object prior to beam reflection as well as return passage of a reflected beam following beam reflection back towards the transceiver 24. Several sets of holes 34 and 36 are also included in the cover plate 28 outside of the opening 30. The large opening 30 includes service opening standoffs or recesses 38 that permit access facilitating positional adjustment of the transceiver 24 when needed, while the sets of holes 34 and 36 permit clamping bolts to pass through the cover plate 28 in different locations for purposes that will be described.

Figure 3:
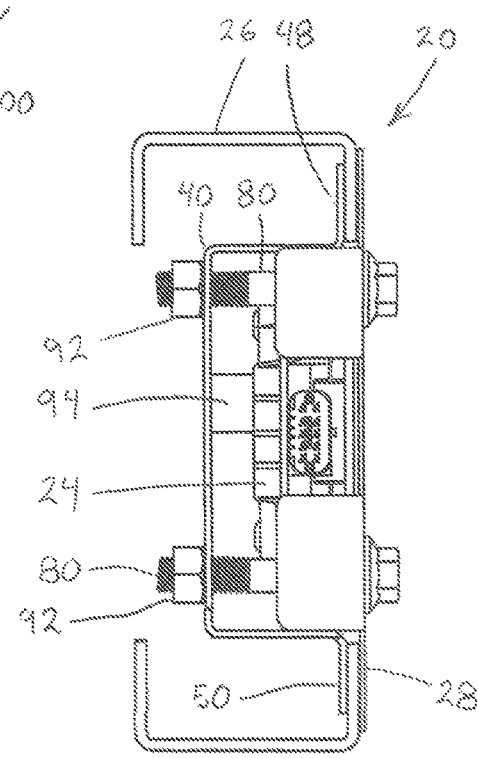
FIG. 3 is a side view of a bracket and cover plate according to the invention securing a transceiver to a vehicle bumper.
Figure 6:
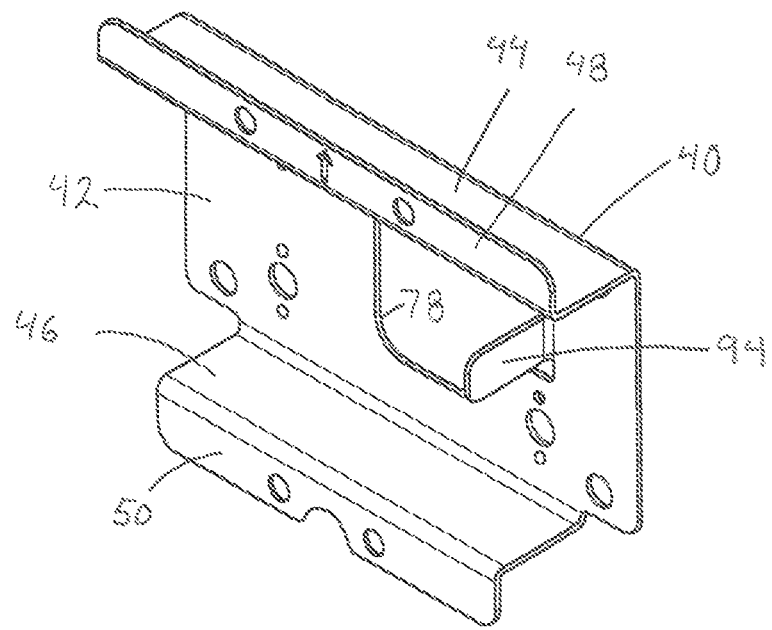
FIG. 6 is a perspective view of the bracket shown in FIG. 3 and other figures.
Figure 7:
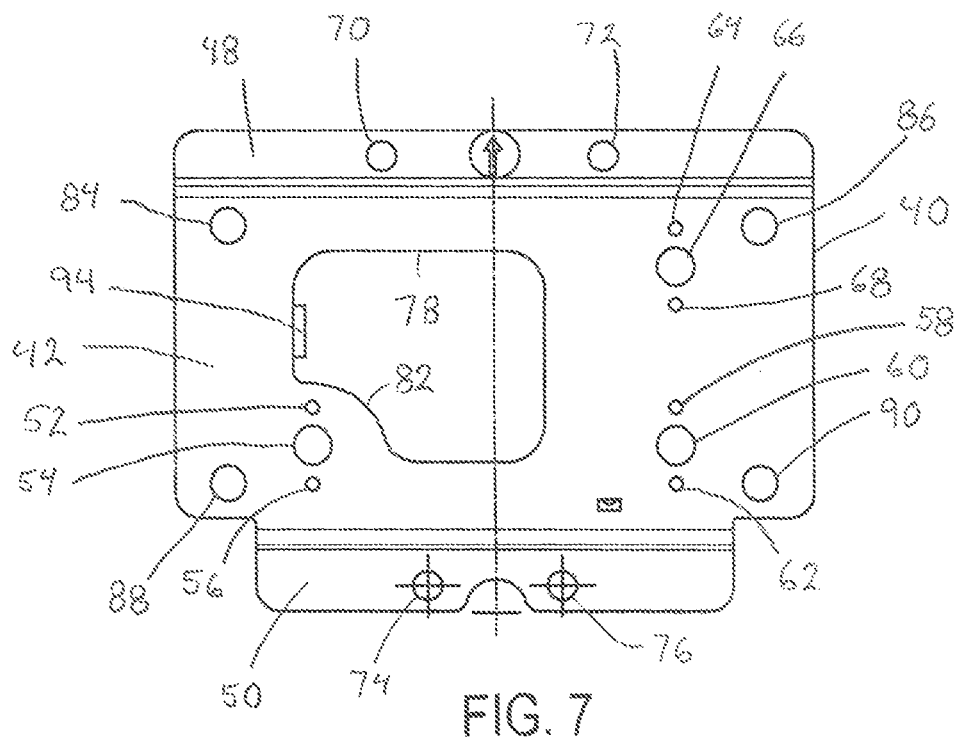
FIG. 7 is a rear view of the bracket shown in FIG. 6.

The side view supplied by FIG. 3 shows a bracket 40 forming part of the FLR assembly 20 on a side of the vehicle bumper 26 opposite the cover plate 28. Details of the bracket 40 are illustrated in FIGS. 6 and 7. Referring to FIG. 6, the bracket 40 includes a channel base 42, approximately parallel lateral channel walls 44 and 46 extending along opposite sides of the channel base 42, a first lip flange 48 extending along an end of the channel wall 44 located away from the bracket channel base 42, and a second lip flange 50 extending along an end of the channel wall 46 located away from the bracket channel base 42. As best seen in FIG. 7, the bracket channel base 42 is provided with four mounting holes 84, 86, 88, and 90, a first set of adjustment member holes 52, 54, and 56, a second set of adjustment member holes 58, 60, and 62, and a third set of adjustment member holes 64, 66, and 68. At least one set of the adjustment member holes, here the adjustment member holes 52, 54, and 56, may be located in an enlargement 82 (FIG. 7) at a corner of an opening 78 permitting partial access to the transceiver 24 without taking the overall FLR package or assembly 20 apart. The enlargement 82 is designed to contact or abut a surface of the transceiver 24 to aid in mounting. Four alternate mounting holes 70, 72, 74, and 76, usable in place of or in addition to the mounting holes 84, 86, 88, and 90, depending on space constraints or fixing requirements, can be provided in the lip flanges 48 and 50.

In a preferred manner of assembly, prior to securing the cover plate 28 and the bracket 40 to each other, the transceiver 24 is secured to the bracket 40 via adjusters, described below. Once the transceiver 24 and the bracket 40 are assembled, the installer will place them in a proper bumper location, and then assemble the cover plate 28 for clamping, so that any interaction between the bracket 40 and the transceiver 24 comes before interactions with the bumper 26 or the cover plate 28. The transceiver 24 could alternatively be placed either on the cover plate 28 or on the bracket 40. In this case, as the cover plate 28 and the bracket 40 are brought in proximity to each other, the transceiver 24 will be forced into a suitable position relative to the cover plate 28 by engagement with the cover plate around the perimeter of the large opening 30 as well as by way of positioning tabs 98 at a first lateral cover plate side and a further positioning tab 100 at a second lateral cover plate side, opposite the first side. At the same time, the transceiver 24 will be placed into a suitable position relative to the bracket 40. The bracket 40 includes the enlargement 82 mentioned above and a positioning tab 94, projecting from the bracket channel base 42, that also aids in positioning the transceiver 24. The enlargement 82 mentioned is best visible in FIG. 7, while the positioning tab 94 is best visible in FIGS. 3, 6, and 7.

To clamp the cover plate 28 and the bracket 40 together, thereby resulting in the configuration shown in FIG. 3, which also shows the bumper 26 as clamped between the cover plate and the bracket, the bracket 40 and the transceiver 24 are assembled via adjusters 102, described below, which adjusters 102 both fasten the transceiver 24 to the bracket 40 and allow adjustment as will be described. All orientation features on the bracket 40, after this step, have aligned the transceiver 24 in its proper position, and the transceiver cannot be mounted backward. The bracket 40 and the transceiver 24 are then placed in the area of the vehicle bumper 26 for assembly. The cover plate 28 is then aligned to the subassembly that is mounted on the bumper 26, and the bolts 80 are then used to clamp the subassembly and the cover plate 28 onto the bumper 26. As an alternative, the holes 84, 86, 88, and 90 in the bracket channel base 42 and the holes 34 in the cover plate 28 could be aligned while the cover plate 28 and the bracket 40 are engaged with opposite side surfaces of the bumper 26. When attaching the overall clamp mount 32 to the bumper 26, the lip flanges 48 and 50 and longitudinal edge areas of the cover plate 28 will engage the opposite side surfaces of the bumper. At this point, bolts 80 may be passed through the holes 34 in the cover plate 28 and through the holes 84, 86, 88, and 90 in the bracket channel base 42 that are aligned with those holes 34. Nuts 92, which preferably have been welded onto the back of the bracket channel base 42 but that alternatively can be applied separately, are then screwed onto threaded ends of the bolts 80 to interconnect the cover plate 28 and the bracket 40 as shown in FIGS. 3 and 5. The vehicle bumper 26 will either have individual openings allowing for passage of the bolts 80 or will have an opening large enough to permit of the bolts 80 to pass through but small enough so that the outer perimeter of the cover plate 28 and the lip flanges 48 and 50 of the bracket 40 press against opposite bumper surfaces, as shown in FIG. 3.

FIGS. 4 and 5 show another embodiment of the invention having a cover plate 128 that is enlarged with respect to the standard-sized cover plate 28 discussed in connection with FIGS. 1-3, but that is otherwise essentially the same as the embodiment shown in FIGS. 1-3. The bumper 26 is not included in the illustrations provided by FIGS. 4 and 5. Adjusters 102 are preferably assembled onto the bracket 40 with the transceiver 24 before any other assembly, as noted above. Alternatively, after the bracket 40 and either the standard cover plate 28 illustrated in FIGS. 1-3 or the enlarged cover plate 128 illustrated in FIGS. 4-5 are secured together by way of the bolts 80 and the nuts 92, and either before or after the overall clamp mount 32 is secured to the bumper 26, adjusters 102 may be secured to the clamp mount 32. Each adjuster 102 includes a stem 104 and a head 106, and, in each case, an internally threaded bore 108 extends through both the adjuster stem 104 and the adjuster head 106. Each bore 108 aligns with one of the adjustment member holes 54, 60, and 66 for reception of one of three adjustment screws 112, which also pass through ears 114 formed with or secured to a casing of the transceiver 24. Each adjuster head 106 is also provided with a pair of pin holes 110 at diametrically opposite sides of the bore 108. These pin holes 110 will coaxially align with the adjustment member holes 52, 56, 58, 62, 64, and 68 provided in the channel base 42 so that alignment pins (not shown) can be inserted into the pin holes 110 and the adjustment member holes 52, 56, 58, 62, 64, and 68 for easy positioning during assembly. Axial displacement of the adjusters 102 is accomplished by rotating the screws 112. Proper alignment of the transceiver 24 within the clamp mount 32 is thus readily achieved, prior to attaching the cover plate 28 or 128 or after removing that cover plate following attachment, by rotating the screws 112 in the manner mentioned.

The lip flanges 48 and 50 of the bracket 40 may optionally include several features to assist with connection of the bracket to the bumper or other vehicle structure. FIG. 6, for example, shows the first lip flange 48 as having an arrow 116, indicating proper bracket orientation, and the second lip flange 50 as having a recess 96, which could indicate proper bracket orientation, provide for vehicle component clearance, or both.

A clamp mount design according to the invention is particularly suitable for package cars, but can be applied to any truck or other vehicle. It will be apparent from the preceding description that the design can be mounted using only clamping forces, and that it operates to reduce installation time and cost by eliminating the need to drill holes in a bumper. In a broad sense, the assembly includes a main forward looking radar bracket and a radar cover for added protection, without sacrificing radar beam visibility, and is clamped using fasteners.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A mount for securing an element on a vehicle comprising:
   a bracket securable to a first surface of a vehicle component,
   a cover plate securable to a second surface opposite to the first surface of the vehicle component and opposite the bracket, and
   fasteners extending through the cover plate and the bracket to clamp the bracket and the cover plate against the opposite surfaces of the vehicle component with the element disposed between the cover plate and a base of the bracket.

2. The mount according to claim 1, wherein
   the vehicle component is a bumper, and
   the fasteners include at least one bolt securable in place by a nut that is adjustable to force flanges of the bracket and longitudinal edge areas of the cover plate to engage the opposite surfaces of the bumper.

3. The mount according to claim 1, wherein
   the element is a radar transceiver, and
   the cover plate includes an opening permitting transmission of a beam from the radar transceiver toward an object prior to beam reflection as well as return passage of a reflected beam following beam reflection back towards the radar transceiver.

4. The mount according to claim 3, further comprising an alignment arrangement permitting changes to the element positioning between the cover plate and the base of the bracket for proper alignment of the transceiver.

5. The mount according to claim 4, wherein the alignment arrangement includes adjustment screws interconnecting a casing of the transceiver with adjusters engaging the bracket.

6. The mount according to claim 5, wherein the adjusters include holes to receive pins for proper alignment during assembly.

7. The mount according to claim 1, wherein at least one of the bracket and the cover plate has a positioning tab to keep the element properly positioned when securing the bracket and the cover plate together.

8. The mount according to claim 7, wherein the positioning tab projects from the bracket base.

9. The mount according to claim 7, wherein the positioning tab projects from at least one side of the cover plate.

10. A process of securing an element on a vehicle comprising:
    placing the element on at least one of a cover plate and a bracket of a mount for securing the element on a vehicle component, and
    clamping the bracket and the cover plate against opposite sides of the vehicle component, with the element located between the cover plate and a base of the bracket, wherein
       clamping the bracket and the cover plate is performed by extending fasteners through the cover plate and the bracket and then adjusting a nut, and
       adjusting the nut forces flanges of the bracket and longitudinal edge areas of the cover plate against opposite surfaces of the vehicle component.

11. The process according to claim 10, further comprising aligning a position of the element between the cover plate and the base of the bracket after clamping the bracket and the cover plate against opposite sides of the vehicle component.

12. The process according to claim 10, wherein
    the element is a transceiver, and
    the process further comprises:
       aligning the cover plate and the bracket with pins after placing the transceiver on the at least one of the cover plate and the bracket.

13. The process according to claim 10, wherein
    the element is a transceiver, and
    the process further comprises:
       aligning at least one of the cover plate and the bracket with the transceiver with a tab on the at least one of the cover plate and the bracket.

14. The process according to claim 10, wherein the vehicle component is a bumper.

15. A radar transceiver securing arrangement comprising:
    a bracket to be secured to a first surface of a carrier,
    a cover plate securable to a second surface opposite to the first surface of the carrier and opposite the bracket, and
    fasteners extending through the cover plate and the bracket to clamp the bracket and the cover plate against the opposite surfaces of the carrier with the radar transceiver disposed between the cover plate and a base of the bracket.

16. The arrangement according to claim 15, wherein the fasteners include at least one bolt securable in place by a nut that is adjustable to force flanges of the bracket and longitudinal edge areas of the cover plate to engage the opposite surfaces of the carrier.

17. The arrangement according to claim 15, wherein the cover plate includes an opening permitting transmission of a beam from the radar transceiver toward an object prior to beam reflection as well as return passage of a reflected beam following beam reflection back towards the radar transceiver.

18. The arrangement according to claim 15, further comprising an alignment arrangement permitting changes to radar transceiver positioning between the cover plate and the base of the bracket for proper alignment of the radar transceiver.

* * * * *